United States Patent [19]

Bireley

[11] Patent Number: 4,941,501

[45] Date of Patent: Jul. 17, 1990

[54] SENSOR SYSTEM

[75] Inventor: Richard L. Bireley, San Diego, Calif.

[73] Assignee: Aquametrics, Inc., San Diego, Calif.

[21] Appl. No.: 306,392

[22] Filed: Feb. 6, 1989

[51] Int. Cl.[5] .............................................. F16K 17/36
[52] U.S. Cl. ...................................... 137/78.3; 239/63; 239/64
[58] Field of Search ................... 137/78.3; 239/63, 64

[56] References Cited

U.S. PATENT DOCUMENTS

| 3,771,548 | 11/1973 | Rauchwerger | 137/78.3 |
|---|---|---|---|
| 4,657,039 | 4/1987 | Bireley et al. | 137/78.3 |
| 4,693,419 | 9/1987 | Weintraub et al. | 137/78.3 |
| 4,785,843 | 11/1988 | Nicholson | 137/78.3 |
| 4,838,296 | 6/1989 | Brooks | 137/624.11 |

Primary Examiner—A. Michael Chambers
Attorney, Agent, or Firm—Ellsworth R. Roston; Charles H. Schwartz

[57] ABSTRACT

A sensor is disposed in an earth patch for sensing the amount of moisture in such patch by providing a capacitance having a variable value dependent upon the sensed moisture. The variable capacitance is included in an oscillator which produces a signal at a frequency variable in accordance with variations in the capacitive value. The oscillator is energized by a direct potential passing through a cable from a potential source at a central station. A rectifier and a filter capacitor prevent the signal produced in the oscillator from interfering with the energizing of the oscillator by the direct potential. The signal from the oscillator passes through the cable to a stage at a controller. The incoming signal is prevented from interfering with the energizing voltage source by a filter inductor. A first controller stage reestablishes the incoming signals relative to a ground potential. The signal is the converted to a direct voltage which varies as a function of signal frequency. This voltage is then introduced to a comparator. A second voltage obtained from the voltage source and adjustable to indicate a desired amount of moisture in the monitored area of earth is also introduced to the comparator. The comparator produces an output dependent upon the relative values of the direct voltage obtained from the variable frequency signal and the adjustable direct voltage. This output controls the energizing of a solenoid at that position. When the solenoid is energized, it operates the valve for producing a watering of the patch of earth.

19 Claims, 2 Drawing Sheets

SENSOR SYSTEM

This invention relates to systems for controlling the watering of an area of earth in accordance with the amount of moisture in the sample portion of that earth. More particularly, the invention relates to a system to control the amount of moisture in an area of earth in accordance with the amount of moisture in a sampled portion of the earth. The invention particularly relates to a system in which (a) stages for measuring the amount of moisture in a patch of earth and for producing signals representative of such measurement are disposed at the patch of earth, (b) stages for processing such signals are disposed at a controller located near a valve, and (c) a communication between such different stages is provided by a coaxial cable extending between the patch of earth and the controller.

As the number of people in the world progressively increases and life becomes progressingly complex, the earth's resources become increasingly taxed. For example, a generation ago the amount of water available in most communities appeared to be quite plentiful. This water was available from rivers and lakes and from underground sources. Now many responsible people are concerned that the supply of water in many communities is somewhat limited. Substantial efforts are being made in many communities to preserve the limited supplies of water that appear to be available. These efforts have had only a limited beneficial effect thus far. Considerable work will still have to be done to limit the use of water so that future generations will be able to have a decent standard of living.

As the availability of water becomes limited, the price of water tends to increase. Furthermore, as the availability of water becomes limited, individuals tend to become restricted in the use of water. The restrictions in the use of water as applied to individuals are often more severe than the restrictions in the use of water as applied to business and industrial organizations.

Because of the increased costs of water and at times the decreased availability of water, individuals have had to become careful how they use water. One of the large uses of water by individuals has been in the maintenance of lawns and gardens. These lawns and gardens consume a surprisingly large percentage of the total amount of water used by individuals for all purposes including drinking, bathing and cooking. Individuals are not willing to forsake their lawns and gardens because these lawns and gardens add beauty and meaning to their lives. It has accordingly become increasingly important for individuals to conserve water in connection with their lawns and gardens so that they can maintain the beauty and meaning of their lives while saving money and practising environmental controls.

A considerable effort has been made, and significant amounts of money have been expanded, to provide systems for providing practical controls over the amount of water used in maintaining lawns and gardens for the home. Such efforts and expenditures of money have not been entirely successful. This has resulted in part because of the inability of those making the efforts and expending the moneys to provide practical and inexpensive systems which can be easily installed into watering systems now in use at the homes without requiring any significant changes in such watering systems.

For example, it has been difficult to dispose sensors at isolated patches of earth to indicate the amount of water in such earth patches and to energize the sensors from a remote position, through a single line, to obtain such indications from the sensors. It has also been difficult to control the energizing of solenoids at the controller location in accordance with the indications from the sensors and to provide for the watering of the patch of earth in accordance with the controlled energizings of the solenoids.

This invention provides a system which overcomes the problems discussed above. It provides stages in selected locations for measuring the moisture in the patch of earth and for producing signals representative of such measurements. It also provides stages located adjacent to the valve for processing such signals to control the watering of the patch of earth. It further provides for communication between each stage at the patch of earth and the associated stages at the valve location through a coaxial cable. Additionally, it provides for the production of an energizing potential at the controller station and for the introduction of this potential through the same cable to the stage at the patch of earth to energize such stage for the production of the signal indicative of the amount of moisture in the patch of earth.

In one embodiment of the invention, a system controls the watering of a patch of earth. The system includes a sensor disposed in the patch of earth for sensing the amount of moisture in such patch as by producing a capacitance having a variable value dependent upon the sensed moisture. The variable capacitance is included in an oscillator which produces signals at a frequency variable in accordance with variations in the capacitive value. The oscillator is energized by a direct potential passing through a cable from a potential source at a remote location at the valve. However, the signal produced in the oscillator is prevented from interfering with the energizing of the oscillator by the direct potential.

The signals from the oscillator pass through the cable to a stage at the valve controller. This stage establishes the signal relative to a ground potential. The signal is then converted to a direct voltage which is introduced to a comparator. The comparator is energized by the direct potential without interference from the variable frequency signals. A voltage obtained from the voltage source and adjustable to indicate a desired amount of moisture in the patch of earth is also introduced to the comparator.

The comparator produces an output dependent upon the relative values of the direct voltage obtained from the variable frequency signal and the adjustable direct voltage. This output controls the energizing of a valve solenoid. When the solenoid is energized, it operates the valve for producing a watering of an area of the earth around a sprinkler head. In the drawings.

Figure 1:
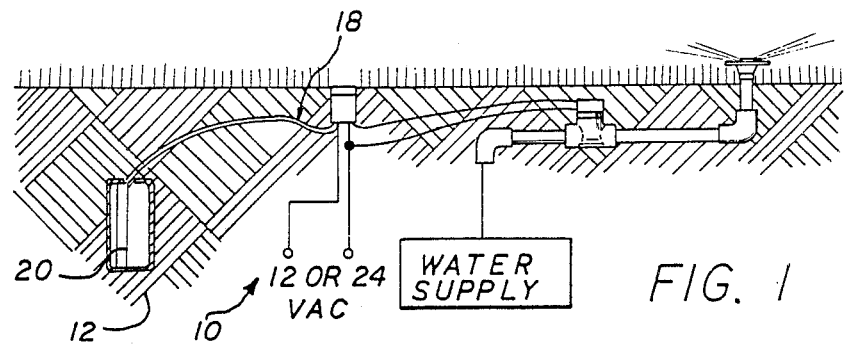
FIG. 1 is a schematic diagram illustrating a system, preferably for home use, for providing a controlled watering of a patch of earth to maintain a particular amount of moisture in the patch of earth.

In one embodiment of the invention, a system generally indicated at 10 is provided for controlling the watering of a patch of earth 12. The system 10 includes stages generally indicated in broken lines at 14 in FIG. 4 for sensing the amount of water in the patch of earth 12 and for producing signals indicative of such amount of water. The system 10 further includes stages generally indicated in broken lines at 16 in FIG. 4 for processing the signals from the stages 14 for controlling the watering of the patch of earth 12 in accordance with the information processed from such signals. The stages 14 are adapted to be disposed at the patch of earth 12 and the stages 16 are adapted to be disposed at a central position displaced from the patches of earth. A coaxial cable generally indicated at 18 provides a communication between the stages 14 and 16.

Components are included in each of the stages 14 and 16 for providing for the introduction of a direct potential from the stages 16 through the coaxial cable 18 to the stages 14 for energizing the stages 14 to produce the signals indicative of the amount of moisture in the earth. Components are also included in each of the stages 14 and 16 for introducing the signals from the stages 14 through the coaxial cable 18 to the stages 16 to obtain the processing of the signals by the stages 16 without any interference from such signals in the energizing of the stages 16 by the direct potential.

Figure 2:
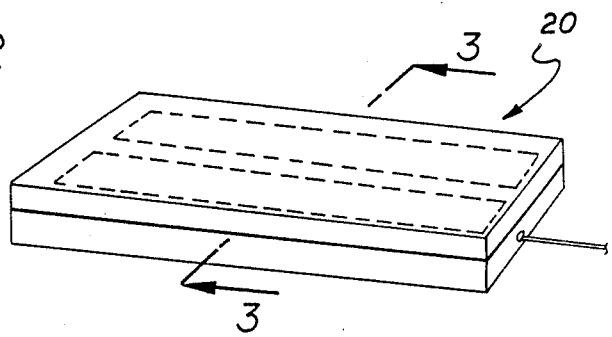
FIG. 2 is a schematic perspective view of a sensor included in the system of FIG. 1 for indicating the amount of moisture in the patch of earth.
Figure 3:
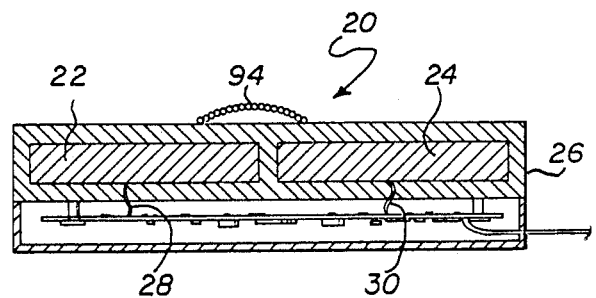
FIG. 3 is a sectional view of the sensor shown in FIG. 2 and is taken substantially on the line 3—3 of FIG. 2.
Figure 5A:
FIG. 5 schematically illustrates waveforms of signals produced at strategic terminals in the circuit diagram shown in FIG. 4.
Figure 5B:
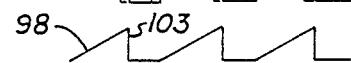
Figure 5C:
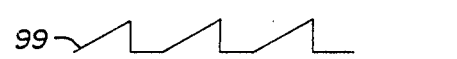
Figure 5D:
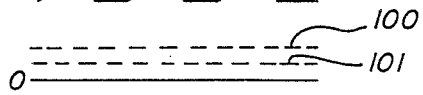

The stages 14 are responsive to a sensor generally indicated at 20 in FIGS. 2 and 3. The sensor 20 is adapted to be disposed in the patch of earth 12. The sensor 20 may be formed in a thin planar relationship. It may include a pair of thin planar electrodes 22 and 24 each of which may be formed from a suitable conductive material such as copper. A layer of a thin dielectric material having electrically insulating properties is disposed in a substantially uniform thickness on the electrodes 22 and 24 to cover the electrodes. The dielectric material 26 has a high dielectric constant. Electrical leads 28 and 30 may respectively extend from the electrodes 22 and 24. The electrical leads 28 and 30 are respectively connected to terminals 32 and 34 in the stages 14 shown in FIG. 2. The leads 28 and 30 are kept short (less than ½") to minimize interference.

The stages 14 may be constructed in a manner similar 4 to that disclosed in detail in co-pending application Ser. No. 004,047 filed by Richard Birely on Jan. 16, 1987, for a "Soil Moisture Monitor" and assigned of record to the assignee of record of this application. The stages 14 include a pair of resistances 35 and 36 in series. Each of the resistances 35 and 36 may have a suitable value such as approximately thirty-three kilo-ohms (33K). The sensor (20) is connected to terminals 32 and 34 of block 14, connecting it to the multivibrator, indicated in block form at 40, by which it is driven. The multivibrator 40 may be disposed on an integrated circuit chip. The output from the multivibrator 40 is introduced through a capacitance 42 to the inner line 44 of the coaxial cable 18. The capacitance 42 may have a suitable value such as approximately one tenth of a microfarad (0.1 μ fd).

The voltage on the line 44 is introduced to the anode of a diode 46, the cathode of which is connected to the capacitance 47 which has a suitable value such as approximately one microfarad (1 μ fd). The other terminal of the capacitance 47 is connected to the terminal 34, which provides a circuit ground, thereby providing a stable operating voltage for the multivibrator 40. The common terminal of the multivibrator 40 and an external conductive covering 48 of the cable 18 are also connected to the ground terminal 34. All connections and terminals of both the sensor block 14 and the controller block 16 are carefully insulated from ground to avoid interference with sensor action.

The energy for operating the stages 14 is provided by a rectifier in the stages 16 at the controller. The rectifier includes terminals 50 for receiving an alternating voltage having a particular amplitude such as approximately twelve volts (12V.) or twenty four volts (24V.). The alternating voltage across the terminals 50 is introduced to the anode of a diode 52, the cathode of which is connected to one terminal of an input filter capacitance 54 having a suitable value such as approximately fifty microfarads (50 μ fd). A voltage regulator 56 indicated in block form is connected across the capacitance 54. The voltage regulator 56 may be constructed in a conventional manner. An output filter capacitance 58 having a suitable value such as approximately one tenth of a microfarad (0.1 μ fd) is disposed electrically across the voltage regulator 56.

An inductor 60 having a suitable value such as approximately ten millihenries (10 mh) is connected between the capacitance 58 and the inner line 44 of the coaxial cable 18. The lower one of the terminals 50 in FIG. 2 is common electrically with the exterior conductive shielding 48 in the cable 18. A capacitance 62 and a diode 64 are in series between the line 44 and the exterior shielding of the cable 18, the anode of the diode 64 being connected to the shielding 48. The capacitance 62 may have a suitable value such as approximately forty seven hundredths of a microfarad (0.47 μ fd).

A parallel arrangement of a resistance 66 and a diode 68 is in series with a capacitance 70 across the diode 64, the cathode of the diode 68 being common with the cathode of the diode 64. The resistance 66 may have a suitable value such as approximately three and nine tenths kilo-ohms (3.9K) and the capacitance 70 may have a suitable value such as approximately one hundredth of a microfarad (0.01 μ fd). A diode 72 and a capacitance 74 are in series across the capacitance 70, the anodes of the diodes 68 and 72 being common. A resistance 76 is in parallel with the capacitance 74. The capacitance 74 may have a suitable value such as approximately forty seven hundredths of a microfarad (0.4 μ fd) and the resistance 76 may have a suitable value such as approximately one megohm (1 M).

The voltage across the resistance 76 may be introduced to an input terminal of a differential amplifier 80, which may be constructed in a conventional manner. Another input terminal of the differential amplifier 80 is connected to the movable arm of a potentiometer 82. The stationary contacts of the potentiometer 82 are connected to the voltage regulator 56 and ground. Other terminals of the differential amplifier 80 respectively receive a potential from the capacitance 58 and from ground.

Resistances 84 and 86 are in series with the resistance 76 between the capacitance 58 and ground. The resistances 84 and 86 may respectively have values of four hundred and seventy ohms (470) and twenty two megohms (22 M). The terminal common to the resistances 84 and 86 is connected to the output terminal of the differential amplifier 80. One terminal of a resistance 88 having a suitable value such as approximately twenty two hundred ohms (2.2K) is also connected to the output terminal of the differential amplifier 80. The other terminal of the resistance 88 is common with a triac 90 which may be constructed in a conventional manner. The triac 90 is disposed electrically in a circuit with a solenoid 92. When energized, the solenoid 92 actuates a valve (not shown) which provides for a passage of water (such as by sprinkling) to the patch of earth 12.

The sensor 20 is disposed in the patch of earth 12 to determine the amount of moisture in the patch of earth. The moisture forms conductive paths 94 (FIG. 3) to the dielectric 26. These conductive paths define capacitances with the electrodes 22 and 24. Each of these conductive paths defines another electrode. As a result, the number of capacitances formed by the conductive paths 94 with the electrode 22 is dependent upon the amount of moisture in the patch of earth 12.

The conductive paths 94 also extend to the electrode 24 to form capacitances with the electrode. The capacitances including the electrode 22 are in series with the capacitances including the electrode 24 because of the electrical leads established by the conductive paths 94. The values of these capacitances are dependent upon the amount of moisture in the patch of earth 12. These capacitances are connected, as a practical matter, through the loads 28 and 30 across the terminals 32 and 34. These capacitances control the frequency of alternating signals produced by the multivibrator 40 in FIG. 4.

The multivibrator 40 is energized by the direct potential produced across the capacitances 54 and 58. This direct potential is produced by the operation of the diode 52 and the capacitance 54 in rectifying the alternating voltage introduced across the terminals 50 and by the operation of the capacitance 58 in smoothing the rectified voltage across the capacitance 54. The voltage regulator 56 operates to insure that a direct potential such as approximately ten volts (10V.) is introduced from the capacitance 58 through the coaxial cable 18 and the diode 46 to the multivibrator 40 to energize the multivibrator.

The diode 46 is effective in insuring that the alternating signals produced by the multivibrator 40 are prevented from being introduced back to the multivibrator 40. In this way, the multivibrator 40 is energized only by the direct potential from the capacitance 58 and the voltage regulator 56. The capacitance 42 is effective in coupling the signal from the multivibrator 40 to the coaxial line 18.

The alternating signals produced by the multivibrator 40 have a frequency dependent upon the amount of moisture in the patch of earth 12. These signals are indicated schematically in solid lines at 96 in FIG. 5(a) for one frequency and are indicated in broken lines at 97 in FIG. 5(a) for an increased frequency. The alternating signals 96 (or 97) pass through the capacitance 42 and the coaxial cable 18 to the stages 16 at the central position. The alternating signals 96 (or 97) in FIG. 5 are prevented by the filter inductor 60 from interfering with the energizing of the stages 16 by the direct potential from the voltage regulator 56. The capacitance 62 couples the incoming signal from the multivibrator 40 into the stages 16 while preventing the potential from the voltage regulator 56 from interfering with the operation of the stages 16.

The alternating signals 96 (or 97) from the multivibrator 40 pass through the capacitance 62 to the diode 64. The diode 64, in conjunction with the capacitor 62, restores the signal to a ground reference level from its previous level which was offset by the energizing voltage. This signal is introduced to the resistance 66 and the capacitance 70. The capacitance 70 becomes charged through the resistor 66 by the positive portion of this signal to produce a signal indicated at 98 in FIG. 5(b) when the alternating signals are as indicated at 96 in FIG. 5(a). The diode 68 provides for a rapid discharge of the capacitor 70 to produce the ramp function indicated at 98 in FIG. 5(d). The signal 98 is rectified and filtered by the diode 72 and the capacitance 74 to produce a direct voltage 100 (indicated in solid lines in FIG. 5(d)) across the capacitance. The magnitude of this direct voltage is related to the frequency of the alternating signals. This may be seen by a comparison with a voltage 101 (indicated in broken lines in FIG. 5(d)) which is produced when the alternating signals have a frequency as indicated at 97 in FIG. 5(a). When the alternating signals have a frequency as indicated at 97 in FIG. 5, the capacitor 70 produces a ramp voltage as indicated at 99 in FIG. 5(c).

Figure 4:
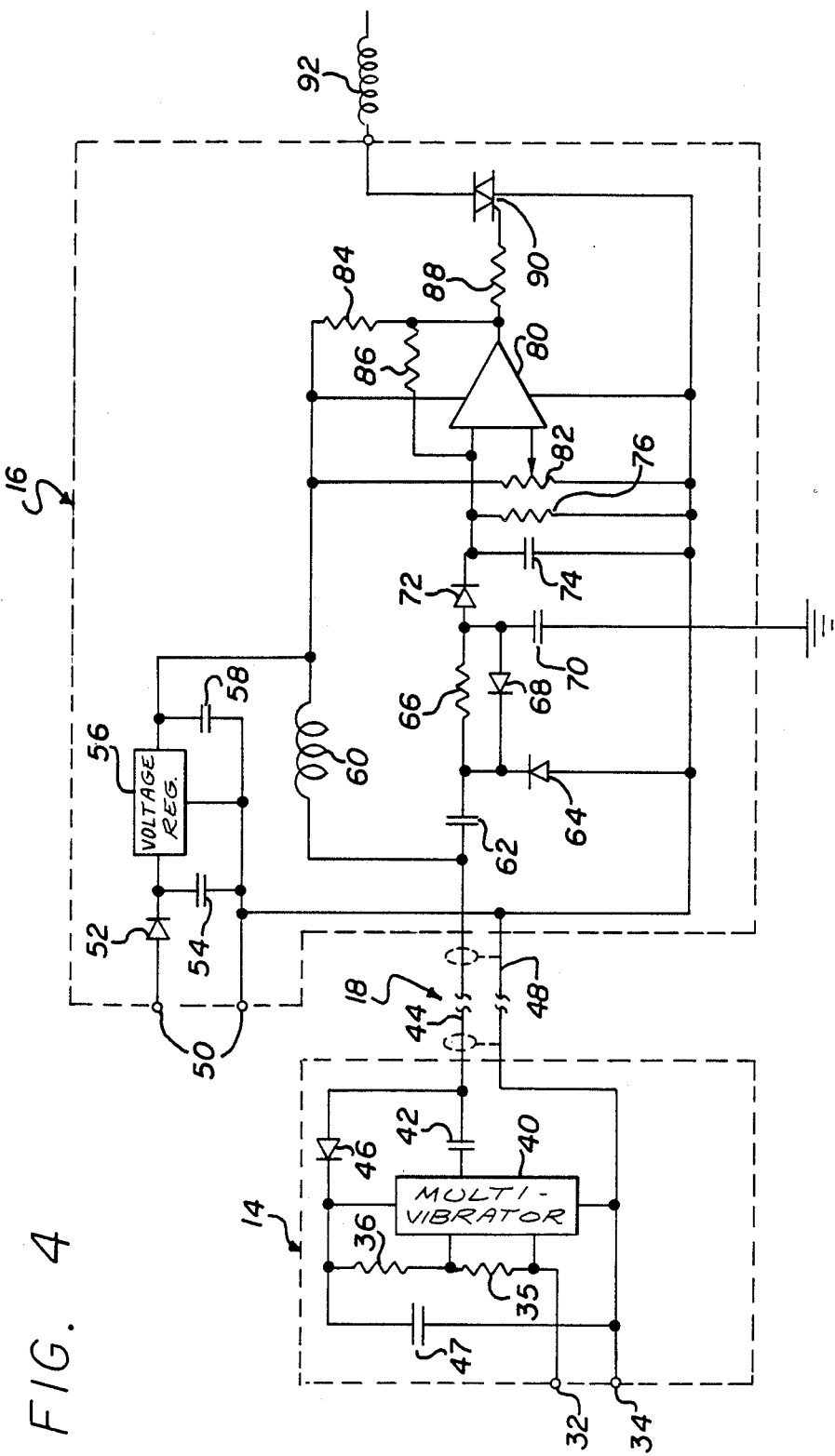
FIG. 4 is a circuit diagram of the electrical circuitry included in the system shown in FIG. 1.

The direct voltage 100 (or 101) is introduced to the comparator 80 in FIG. 4 for comparison with the voltage produced on the movable arm of the potentiometer 82. This voltage is adjustable in accordance with the amount of moisture desired in the patch of earth 12. When the direct voltage 100 (or 101) across the capacitance 74 exceeds the adjustable voltage on the movable arm of the potentiometer 82, the comparator 80 output switches from high to low to produce an output voltage which switches the triac 90 to an ON condition and energizes the solenoid 92. The solenoid 92 then opens the valve (not shown) to provide for a watering of the patch of earth 12. When the direct voltage 100 (or 101) across the capacitance 74 is less than the adjustable voltage on the movable arm of the potentiometer 82, the solenoid 92 is not energized. This causes the valve (not shown) to remain closed. As a result, the patch of earth 12 is not watered and the patch of earth is allowed to dry.

The system disclosed above has certain important advantages. It is relatively simple, reliable and inexpensive. Because of this, it is particularly adapted to be used in individual homes to control the watering of a lawn or a garden in these homes. The system is effective in providing a close control over the moisture in the patch of earth 12 so that maximum savings in the use of water are provided by the system.

The system constituting this invention also has other important advantages. It produces the direct potential at the controller position to energize the different stages 14 at the patch of earth 12. In this way, no energizing potential has to be produced at the sensor location. Furthermore, it introduces the energizing potential through the coaxial cable 18 to the stages 14 at the patch of earth. This is desirable because the inner line 44 is electrically shielded by the exterior shielding 48 in the cable 18. This provides for an efficient transfer of the energizing potential from the controller 16 to the stages 14 at the patch of earth 12.

The system constituting this invention also has other important advantages. It provides for the production of the alternating signals by the multivibrator 40 at the patch of earth 12 without interference from the direct potential. This is accomplished by the inclusion of the capacitance 42 at the patch of earth 12. It also provides for the energizing of the multivibrator 40 by the direct potential without interference from the alternating signals produced by the multivibrator 40. This is accomplished by the inclusion of the diode 46 and the capacitor 47 in the stages 14 at the patch of earth.

The stages 16 also include components for insuring that the signals from the multivibrator 40 and the direct potential from the capacitor 58 will not interfere with one another in the proper operation of such stages. For example, the filter inductor 60 is included to insure that the alternating signals passing through the cable 18 from the multivibrator 40 will not interfere with the energizing of the differential amplifier 80 by the direct potential from the capacitance 58. The capacitance 62 is included to insure that the direct potential from the capacitance 58 will not interfere with the optimal response of the stages 16 to the alternating signals from the multivibrator 40.

The stages 16 provide an optimal response to the alternating signals from the multivibrator 40. The stage formed by the diodes 64 and 68, the resistance 66 and the capacitance 70 provide the alternating signals 96 (and 97) relative to ground as a-frame of reference and produce in the capacitance 70 a maximum charge dependent upon the frequency of the alternating 96 (or 97). The stage formed by the diode 72, the capacitance 74 and the resistance 76 convert the maximum charge to a direct voltage. This direct voltage is compared in the differential amplifier 80 with the adjustable voltage from the potentiometer 82 to control the enrgizing of the solenoid 92. In this way, the moisture in the patch of earth 12 is maintained at a pre-set level within relatively close tolerances.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

I claim:

1. In combination for controlling the watering of a patch of earth in accordance with the amount of moisture in the patch of earth,
   a central station displaced from the patch of earth,
   first means at the central station for providing a direct potential,
   second means at the patch of earth for sensing the amount of moisture in the earth and for producing a capacitance having a value dependent upon the amount of such moisture,
   a coaxial cable extending between the patch of earth and the central station,
   third means at the central station for introducing the direct potential to the coaxial cable,
   fourth means responsive at the patch of earth to the direct potential passing through the cable and responsive to the capacitance for producing signals at a frequency dependent upon the value of the capacitance and for introducing such signals to the coaxial cable,
   fifth means responsive at the central station to the signals passing through the coaxial cable for producing a voltage related to the frequency of the signals, and
   sixth means responsive at the central station to the voltage produced by the fifth means for controlling the watering of the patch of earth.

2. In a combination as set forth in claim 1,
   means associated at the patch of earth with the coaxial cable and the fourth means for preventing the direct potential from affecting the operation of the fourth means.

3. In a combination as set forth in claim 1,
   means associated at the central station with the coaxial cable and the fifth means for preventing the direct potential from affecting the operation of the fifth means.

4. In a combination as set forth in claim 3,
   means at the central station for introducing the direct potential to the fifth means to energize the fifth means, and
   means at the central station for preventing the signals from the fourth means from affecting the energizing of the fifth means to provide for the production by the fifth means of the direct voltage having the magnitude related to the variable frequency of the variable frequency signal.

5. In combination for controlling the watering of a patch of earth in accordance with the amount of moisture in the patch of earth,
   a central station displaced from the patch of earth,
   a coaxial cable having ungrounded terminals and extending between the central station and the patch of earth,
   first means at the central station for providing a direct potential,
   second means at the patch of earth for providing a capacitance having a value dependent upon the amount of moisture in the patch of earth,
   third means responsive at the patch of earth to the value of the capacitance for producing signals having a frequency dependent upon such value,
   fourth means at the patch of earth for introducing the direct potential through the coaxial cable to the third means to energize the third means,
   fifth means at the central station for controlling the watering of the patch of earth in accordance with the frequency of the signals from the fourth means, and
   sixth means at the central station for passing the signals through the coaxial cable to the fifth means to obtain the operation of the fifth means in controlling the watering of the patch of earth in accordance with the frequency of the signals from the third means.

6. In a combination as set forth in claim 5,
   means at the patch of earth for preventing the signals from the third means from affecting the energizing of the third means by the direct potential.

7. In a combination as set forth in claim 5,
   means at the central station for preventing the direct potential from passing through the coaxial cable to affect the operation of the fifth means in responding to the signals from the third means.

8. In a combination as set forth in claim 7,
   means at the central station for introducing the direct potential to the fifth means to energize the fifth means for the control of the watering of the patch of earth in accordance with the frequency of the signals form the third means.

9. In a combination as set forth in claim 8,
   means at the central station for preventing the signals passing through the third means from affecting the energizing of the fifth means by the direct potential.

10. In a combination as set forth in claim 7, means at the central station for preventing the direct potential from passing through the coaxial cable to affect the operation of the fifth means in responding to the signals from the third means, and means at the central station for preventing the signals passing through the third means from affecting the energizing of the fifth means by the direct potential.

11. In combination for controlling the watering of a patch of earth in accordance with the amount of moisture in the of earth, a central station displaced from the patch of earth, a coaxial cable extending between the central station and the patch of earth, first means at the central station for providing a direct potential, second means at the patch of earth for producing signals having a variable frequency representative of the amount of moisture in the soil, third means at the central station for introducing the direct potential through the coaxial cable to the second means to energize the second means for the production of the signals of variable frequency, fourth means responsive at the central station to the passage of the variable frequency signals through the coaxial cable for processing the variable frequency signals, without any effect from the passage of the direct potential through the coaxial cable, to provide a controlled watering of the patch of earth in accordance with the variations in the frequency of such signals, and fifth means at the central station for energizing the fourth means with the direct potential without any effect from the variable frequency signals in the coaxial cable.

12. In a combination as set forth in claim 11, the second means including a sensor constructed to be disposed in the patch of earth and to produce a variable capacitance having a value dependent upon the amount of moisture in the patch of earth and further including means responsive to the variable capacitance for varying the frequency of the signals in accordance with the variations in the value of the capacitance, and means at the patch of earth for preventing the variable frequency signals from affecting the energizing of the second means by the direct potential passing through the coaxial cable.

13. In a combination as set forth in claim 11, means at the patch of earth for preventing the second means from affecting the energizing of the second means by the direct potential.

14. In a combination as set forth in claim 11, means at the central station for preventing the direct potential from affecting the operation of the fourth means in processing the variable frequency signals to provide a controlled watering of the patch of earth in accordance with the variations in the frequency of such signals.

15. In a combination as set forth in claim 12, means at the central station for preventing the second means from affecting the energizing the second means by the direct potential, means at the central station for preventing the direct potential from affecting the operation of the fourth means in processing the variable frequency signals to provide a controlled watering of the patch of earth in accordance with the variations in the frequency of such signals, the fourth means being operative to convert the variable frequency signals to a direct voltage having a magnitude related to the variable frequency of such signals, and means responsive at the central station to the magnitude of the direct voltage for obtaining a controlled watering of the patch of earth, 16. In a combination for controlling the watering of a patch of earth in accordance with the amount of moisture in the patch of earth, a central station displaced from the patch of earth, a coaxial cable having a first terminal and a second terminal which is earthed, the coaxial cable extending between the central station and the patch of earth, first means at the patch of earth for producing alternating signals having characteristics representing the amount of water at the patch of earth, second means at the central station for providing a direct potential and for introducing the direct potential through the coaxial cable to the first means to energize the first means for the production of the alternating signals, third means at the central station for passing the alternating signals through the coaxial cable without interference from the direct potential, and fourth means responsive at the central station to the alternating signals passing through the coaxial cable for processing the signals to provide a controlled watering of the patch of earth in accordance with the characteristics of the alternating signals, 17. In a combination as set forth in claim 16, the fifth means including sixth means at the central station for establishing, relative to the potential of the earth, the signals passing through the coaxial cable and further including seventh means for converting such signals to a direct voltage without interference from the direct potential passing through the coaxial cable, and means at the central station for energizing the seventh means with the direct potential without interference from the alternating signals passing through the coaxial cable.

18. In a combination as set forth in claim 17, comparator means at the central station, eighth means responsive at the central station to the direct potential for providing an adjustable direct voltage, means at the central station for introducing the direct voltage from the seventh means to the comparator means for comparison with the adjustable direct voltage, and means responsive at the central station to the output from the comparator means for obtaining a controlled watering of the patch of earth, 19. In a combination as set forth in claim 18, means at the patch of earth for providing for an energizing of the first means by the direct potential without interference from the first means.

* * * * *